US011040338B2

(12) United States Patent
Nawaz

(10) Patent No.: US 11,040,338 B2
(45) Date of Patent: Jun. 22, 2021

(54) PROCESS OF PREPARING CATALYST; PLATINUM-TIN ON ZINC ALUMINATE-CALCIUM ALUMINATE-ZEOLITE CATALYST FOR SELECTIVE LIGHT ALKANE DEHYDROGENATION

(71) Applicant: SABIC Global Technologies B.V., Bergen op Zoom (NL)

(72) Inventor: Zeeshan Nawaz, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/465,297

(22) PCT Filed: Dec. 6, 2017

(86) PCT No.: PCT/IB2017/057701
§ 371 (c)(1),
(2) Date: May 30, 2019

(87) PCT Pub. No.: WO2018/104887
PCT Pub. Date: Jun. 14, 2018

(65) Prior Publication Data
US 2019/0388881 A1 Dec. 26, 2019

Related U.S. Application Data

(60) Provisional application No. 62/430,458, filed on Dec. 6, 2016.

(51) Int. Cl.
B01J 29/06 (2006.01)
B01J 29/85 (2006.01)
B01J 23/62 (2006.01)
B01J 37/02 (2006.01)
B01J 37/04 (2006.01)
B01J 37/08 (2006.01)
B01J 29/72 (2006.01)
B01J 29/46 (2006.01)
B01J 29/48 (2006.01)
B01J 29/44 (2006.01)
B01J 29/40 (2006.01)
B01J 29/74 (2006.01)
B01J 29/76 (2006.01)
B01J 29/78 (2006.01)
B01J 29/70 (2006.01)
B01J 29/076 (2006.01)
B01J 23/00 (2006.01)
B01J 23/02 (2006.01)
B01J 35/00 (2006.01)
B01J 29/068 (2006.01)

(52) U.S. Cl.
CPC .............. *B01J 29/85* (2013.01); *B01J 23/005* (2013.01); *B01J 23/02* (2013.01); *B01J 23/626* (2013.01); *B01J 29/061* (2013.01); *B01J 29/068* (2013.01); *B01J 29/076* (2013.01); *B01J 29/405* (2013.01); *B01J 29/44* (2013.01); *B01J 29/46* (2013.01); *B01J 29/48* (2013.01); *B01J 29/7065* (2013.01); *B01J 29/72* (2013.01); *B01J 29/74* (2013.01); *B01J 29/743* (2013.01); *B01J 29/76* (2013.01); *B01J 29/763* (2013.01); *B01J 29/78* (2013.01); *B01J 29/783* (2013.01); *B01J 35/0006* (2013.01); *B01J 37/0205* (2013.01); *B01J 37/0207* (2013.01); *B01J 37/04* (2013.01); *B01J 37/088* (2013.01); *B01J 2229/186* (2013.01); *B01J 2229/20* (2013.01); *B01J 2229/37* (2013.01); *B01J 2229/42* (2013.01); *B01J 2523/13* (2013.01); *B01J 2523/23* (2013.01); *B01J 2523/27* (2013.01); *B01J 2523/31* (2013.01); *B01J 2523/41* (2013.01); *B01J 2523/43* (2013.01)

(58) Field of Classification Search
CPC ... B01J 29/72; B01J 29/74; B01J 29/44; B01J 29/46; B01J 29/48; B01J 29/405; B01J 29/743; B01J 29/76; B01J 29/076; B01J 29/763; B01J 29/7065; B01J 29/78; B01J 29/783; B01J 29/061; B01J 29/068; B01J 2229/20; B01J 2229/42; B01J 2229/37; B01J 2229/186; B01J 37/04; B01J 37/088; B01J 37/0205; B01J 35/0006; B01J 23/02; B01J 23/005; B01J 23/626; B01J 2523/13; B01J 2523/23; B01J 2523/27; B01J 2523/43; B01J 2523/41; B01J 2523/31; B01J 2523/33; B01J 2523/51; B01J 2523/828
USPC .............. 502/60, 63, 64, 66, 65, 69, 71, 214
See application file for complete search history.

(56) References Cited

U.S. PATENT DOCUMENTS

| 4,886,928 A | 12/1989 | Imai et al. ..................... 585/660 |
| 4,902,849 A | 2/1990 | McKay et al. ................ 585/660 |

(Continued)

OTHER PUBLICATIONS

International Search Report and Written Opinion from PCT/IB2017/057701 dated Mar. 16, 2018, 17 pages.

(Continued)

*Primary Examiner* — Elizabeth D Wood
(74) *Attorney, Agent, or Firm* — Norton Rose Fulbright US LLP

(57) ABSTRACT

Disclosed are supported platinum-tin (Pt—Sn) based catalysts and methods of their use in selective light alkane dehydrogenation to corresponding alkenes and preparation. The supported catalysts contain a support of blended zeolite, in particular SAPO-34, zinc aluminate compound, and calcium aluminate, impregnated with Pt and Sn metal and a promoter that includes an alkali metal or compound thereof, an alkaline earth metal or compound thereof, or any combination thereof.

11 Claims, 1 Drawing Sheet

(56) References Cited

U.S. PATENT DOCUMENTS

| | | | | |
|---|---|---|---|---|
| 4,926,005 | A | 5/1990 | Olbrich et al. | 585/632 |
| 5,073,662 | A | 12/1991 | Olbrich | 585/660 |
| 6,175,048 | B1 | 1/2001 | Wu et al. | 585/660 |
| 9,873,647 | B2 * | 1/2018 | Iaccino | C07C 5/373 |
| 2016/0122263 | A1 | 5/2016 | Nawaz et al. | 585/659 |
| 2016/0199823 | A1 | 7/2016 | Nawaz | 585/660 |

OTHER PUBLICATIONS

Park et al., "The Effect of Potassium and Tin on the Hydrogenation of Ethylene and Dehydrogenation of Cyclohexane over Pt(111)", *Journal of Catalysis* 178 (1998) 66-75.

Vu et al., "Pt—Sn alloy phases and coke mobility over Pt—Sn/Al2O3 and Pt—Sn/ZnAl2O4 catalysts for propane dehydrogenation", *Applied Catalysis A: General* 400 (2011) 25-33.

Wakui et al. "Dehydrogenative cracking of n-butane using double-stage reaction." *Applied Catalysis A: General* 230 (2002) 195-202.

* cited by examiner

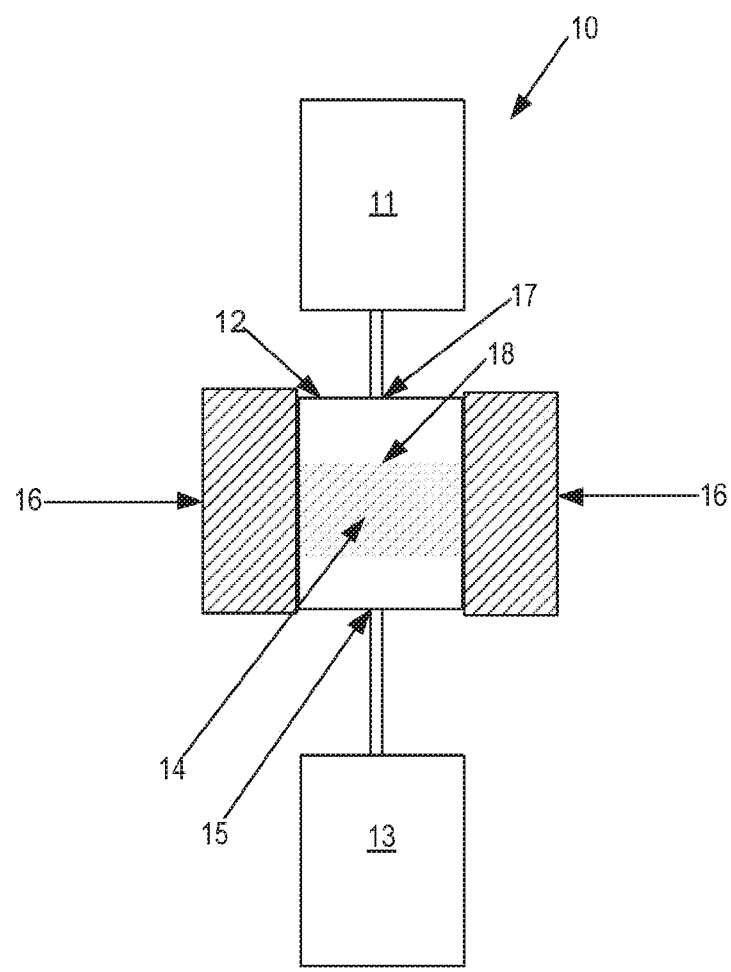

PROCESS OF PREPARING CATALYST; PLATINUM-TIN ON ZINC ALUMINATE-CALCIUM ALUMINATE-ZEOLITE CATALYST FOR SELECTIVE LIGHT ALKANE DEHYDROGENATION

CROSS REFERENCE TO RELATED APPLICATIONS

This application is a national phase application under 35 U.S.C. § 371 of International Application No. PCT/IB2017/057701 filed Dec. 6, 2017, which claims priority to U.S. Provisional Patent Application No. 62/430,458 filed Dec. 6, 2016. The entire contents of each of the above-referenced disclosures is specifically incorporated by reference herein without disclaimer.

FIELD OF INVENTION

The present invention relates to supported platinum-tin (Pt—Sn) based catalysts and uses thereof. More specifically, the present invention relates to a platinum-tin (Pt—Sn) based catalyst that contains a blended support including a zeolite, zinc aluminate, and calcium aluminate that can be used for the preparation of olefins by the direct dehydrogenation of corresponding alkanes.

BACKGROUND OF THE INVENTION

Light olefins are an indispensable raw material for a wide range of petrochemical processes to make numerous downstream products. By way of example, ethylene and propylene are used to make a multitude of plastic products that are incorporated into many articles of manufacture.

One route to $C_2$-$C_8$ olefins includes catalytic dehydrogenation of the corresponding $C_2$-$C_8$ alkanes. Although dehydrogenation of alkanes can be effected by homogeneous catalysts (e.g., pincer complexes), supported heterogeneous catalysis provides the means to meet ever increasing olefin demands. Nonetheless catalytic dehydrogenation under heterogeneous catalysis still suffers from many drawbacks. Present nonoxidative processes, including direct dehydrogenation, require a continuous heat supply (due to the endothermic reaction) and frequent catalyst regeneration. Direct alkane dehydrogenation (endothermic) is a process regularly employed for production of a variety of light alkenes or corresponding alkenes products including $C_2$-$C_8$ olefins and alkylates. Although different catalytic dehydrogenation processes utilizing various catalysts have been commercialized, productivity problems still exist.

U.S. Pat. No. 4,902,849 to McKay et al. and U.S. Pat. No. 4,926,005 to Olbrich et al., both describe a dehydrogenation process in the presence of steam and a catalyst composition comprising a zinc aluminate and/or calcium aluminate support and tin oxide as a promoter. U.S. Pat. No. 4,886,928 to Imai et al., describes a dehydrogenation process in the present of a catalyst comprising a platinum group component, a component selected from the group comprising scandium, lanthanum, and actinium, a component selected from the group comprising tin, lead, and germanium, less than 0.3 wt. % of a halogen component, and an optional Group IA or IIA component, all on a refractory inorganic oxide support. U.S. Patent Application Publication 2016/0122263 to Zeeshan et al., describes a dehydrogenation process using platinum and chromium based catalyst and hydrogen co-injection in the feed. Zeeshan et al. also describes separate Pt—Sn/SAPO-34 and PtSn/$Al_2O_3$ catalysts.

While there have been many attempts at developing supported catalysts for use in direct alkane dehydrogenation reactions, these catalysts oftentimes suffer from relatively quick catalytic deactivation, thereby requiring frequent catalyst regeneration steps, or from low selectivity to olefins. These problems can make the currently available catalysts inefficient for large scale olefin production processes.

BRIEF SUMMARY OF THE INVENTION

A discovery has been made that offers a solution to the aforementioned problems associated with improving catalytic performance for the preparation of olefins by the direct dehydrogenation of alkanes. The solution is premised on forming metal-based dehydrogenation catalysts supported by a blend of a zeolite and zinc aluminate. Without wishing to be bound by theory, the blended support can help increase the efficiency of the overall catalyst in producing olefins and/or increase the structural integrity of the catalyst, thereby reducing the frequency of having to perform catalyst regeneration steps. In particular, it is believed that the presence of zinc aluminate can help strengthen the support and/or modify the electron density of the support, thereby increasing selectivity to olefins. The catalytic metal can be platinum (Pt) or tin (Sn), both Pt and Sn. The support can also include calcium aluminate to further strengthen the support and/or the electron density of the support. In a particular instance, the catalyst can be a platinum-tin (Pt—Sn) based supported catalyst, where the support is a blend of SAPO-34, zinc aluminate, and calcium aluminate. Some non-limiting advantages of the catalysts of the present invention include increased conversion of alkanes, increased selectivity towards olefins, lower catalyst deactivation rates, or robust hydrothermal stability, or any combination thereof, in comparison to other supported dehydrogenation catalysts. Even further, the supported catalysts of the present invention can be used in stationary and/or fluid bed direct propane and butane dehydrogenation processes, preferably vapor phase dehydrogenation processes.

In one aspect of the present invention, there is disclosed a supported platinum-tin (Pt—Sn) based catalyst. The supported catalyst can contain a support that includes a zeolite, a zinc aluminate compound, and optionally a calcium aluminate compound. The catalytically active metals can include Pt metal or a compound thereof, Sn metal or a compound thereof, or a combination of both Pt and Sn metals can be present in the catalyst. The catalyst can also include a promoter that includes an alkali metal or compound thereof, an alkaline earth metal or compound thereof, or any combination thereof. In one aspect, the supported platinum-tin (Pt—Sn) based catalyst can include from 5 to 75 wt. % of the zeolite, based on the total weight of the support and the zeolite can include one or more of SAPO-34, SAPO-11, SAPO-35, ZSM-5, MCM-41, or SBA-15, preferably SAPO-34. In another aspect, the supported platinum-tin (Pt—Sn) based catalyst can include from 25 to 95 wt. % of the zinc aluminate and from 0 to 20 wt. %, preferably 1 to 20 wt. % calcium aluminate, based on the total weight of the support. The catalysts of the present invention can include 0.01 to 10 wt. %, preferably 0.1 to 5 wt. % of the Pt metal, or a compound thereof, and from 0.01 to 10 wt. %, preferably 0.1 to 5 wt. % of the Sn metal or a compound thereof, based on the total weight of the catalyst. In some instances, the supported platinum-tin (Pt—Sn) based catalyst can include from 0.01 to 2 wt. % of the promoter based on the total weight of the catalyst. The promoter can be one or more of lithium (Li), sodium (Na), potassium (K), rubidium (Rb), cesium (Cs), beryllium (Be), magnesium (Mg), calcium (Ca), strontium (Sr), or barium (Ba), preferably K. In certain aspects, the promoter can further include scandium (Sc), yttrium (Y), lanthanum (La), titanium (Ti), zirconium (Zr), hafnium (Hf), vanadium (V), niobium (Nb), tantalum (Ta), chromium (Cr), molybdenum (Mo), tungsten (W), manganese (Mn), technetium (Tc), rhenium (Re), iron (Fe), ruthenium (Ru), osmium (Os), cobalt, (Co), rhodium (Rh), iridium (Ir), nickel (Ni), palladium (Pd), copper (Cu), silver (Ag), gold (Au), cadmium (Cd), mercury (Hg), gallium (Ga), indium (In), thallium (Tl), silicon (Si), germanium (Ge), lead (Pb), or phosphorus (P).

In a further aspect of the present invention, the catalysts of the present invention can be used to catalyze a chemical reaction to convert $C_2$-$C_8$ alkanes to corresponding alkenes, preferably $C_3$ and $C_4$ alkanes to $C_3$ to $C_4$ alkenes. The process can include contacting any one of the catalysts of the present invention with a reactant stream comprising an alkane or a combination of alkanes under reaction conditions sufficient to dehydrogenate the alkanes and produce a product stream comprising corresponding alkenes. The reaction can take place in a reactor, preferably a fixed bed and/or fluidized bed reactor. The reaction temperature can be 520 to 620° C. The reaction pressure can be −0.1 MPa to 0.2 MPa. The gas hour space velocity (GHSV) can be 1 to 20 $h^{-1}$.

In another aspect of the present invention, there is disclosed a process for preparing the catalysts of the present invention. The process can include: (a) dry blending a zeolite, zinc aluminate and optionally calcium aluminate to form a support mixture; (b) adding an acid to the support mixture to form a support mixture paste; (c) calcining the support mixture paste to form a blended support material; (d) optionally impregnating the blended support material with an aqueous promoter precursor solution comprising an alkali metal or a compound thereof, an alkaline earth metal or a compound thereof; (e) calcining the impregnated blended support material to form a calcined promoter/support material; (d) impregnating the calcined promoter/support material with Pt and/or Sn to form a Pt/Sn/impregnated promoter/support material; and (e) calcining the catalytic metal/impregnated promoter/support material to form the catalyst of the present invention. The acid can include an organic acid, preferably acetic acid (AcOH) and/or an inorganic acid, preferably hydrochloric acid (HCl). The calcination of the support mixture paste can include a temperature from 450° C. to 850° C., preferably 550° C. The calcination of the impregnated blended support material can include a temperature from 400° C. to 650° C., preferably 500° C. The calcination of the metal/impregnated promoter/support material can include a temperature from 400° C. to 600° C., preferably 500° C.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and/or packages of compositions of the invention can be used to achieve methods of the invention.

The following includes definitions of various terms and phrases used throughout this specification.

The term "catalyst" means a substance which alters the rate of a chemical reaction. "Catalytic" means having the properties of a catalyst. For example, "catalytically active metal(s)" in the context of the present invention includes metals that can catalyze the dehydrogenation of alkanes to alkenes, such as $C_2$-$C_8$ paraffins to $C_2$-$C_8$ olefins.

The term "conversion" means the mole fraction (i.e., percent) of a reactant converted to a product or products.

The term "selectivity" refers to the percent of converted reactant that went to a specified product, for example $C_2$-$C_8$ olefin selectivity is the % of alkane that formed $C_2$-$C_8$ olefins.

The term "about" or "approximately" are defined as being close to as understood by one of ordinary skill in the art. In one non-limiting embodiment, the terms are defined to be within 10%, preferably within 5%, more preferably within 1%, and most preferably within 0.5%.

The term "substantially" and its variations are defined to include ranges within 10%, within 5%, within 1%, or within 0.5%.

The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The use of the words "a" or "an" when used in conjunction with any of the terms "comprising," "including," "containing," or "having" in the claims or the specification may mean "one," but it is also consistent with the meaning of "one or more," "at least one," and "one or more than one."

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

In the context of the present invention, twenty embodiments are now described. Embodiment 1 is supported platinum-tin (Pt—Sn) based catalyst. The catalyst includes a support containing a zeolite; a zinc aluminate compound; and a calcium aluminate compound; catalytically active metals, the catalytically active metals including Pt metal or a compound thereof; and Sn metal or a compound thereof; and a promoter containing an alkali metal or compound thereof, an alkaline earth metal or compound thereof, or any combination thereof. Embodiment 2 is the supported platinum-tin (Pt—Sn) based catalyst of embodiment 1, containing from 5 to 75 wt. % of the zeolite, based on the total weight of the support. Embodiment 3 is the supported platinum-tin (Pt—Sn) based catalyst of embodiment 2, wherein the zeolite contains one or more of SAPO-34, SAPO-11, SAPO-35, ZSM-5, MCM-41, or SBA-15, preferably SAPO-34. Embodiment 4 is the supported platinum-tin (Pt—Sn) based catalyst of any of embodiments 1 to 3, containing from 25 to 95 wt. % of the zinc aluminate, based on the total weight of the support. Embodiment 5 is the supported platinum-tin (Pt—Sn) based catalyst of any of embodiments 1 to 4, containing from 1 to 20 wt. % calcium aluminate, based on the total weight of the support. Embodiment 6 is the supported platinum-tin (Pt—Sn) based catalyst of any of embodiments 1 to 5, containing from 0.01 to 10 wt. %, preferably 0.1 to 5 wt. % of the Pt metal or a compound thereof, based on the total weight of the catalyst. Embodiment 7 is the supported platinum-tin (Pt—Sn) based catalyst of any of embodiments 1 to 6, containing from 0.01 to 10 wt.

%, preferably 0.1 to 5 wt. % of the catalytic Sn metal or a compound thereof, based on the total weight of the catalyst. Embodiment 8 is the supported platinum-tin (Pt—Sn) based catalyst of any of embodiments 1 to 7, containing from 0.01 to 2 wt. % of the promoter based on the total weight of the catalyst. Embodiment 9 is the supported platinum-tin (Pt—Sn) based catalyst of any of embodiments 1 to 8, wherein the promoter is one or more of lithium (Li), sodium (Na), potassium (K), rubidium (Rb), cesium (Cs), beryllium (Be), magnesium (Mg), calcium (Ca), strontium (Sr), or barium (Ba), preferably K. Embodiment 10 is the supported platinum-tin (Pt—Sn) based catalyst of any of embodiments 1 to 9, wherein the promoter further contains scandium (Sc), yttrium (Y), lanthanum (La), titanium (Ti), zirconium (Zr), hafnium (Hf), vanadium (V), niobium (Nb), tantalum (Ta), chromium (Cr), molybdenum (Mo), tungsten (W), manganese (Mn), technetium (Tc), rhenium (Re), iron (Fe), ruthenium (Ru), osmium (Os), cobalt, (Co), rhodium (Rh), iridium (Ir), nickel (Ni), palladium (Pd), copper (Cu), silver (Ag), gold (Au), cadmium (Cd), mercury (Hg), gallium (Ga), indium (In), thallium (Tl), silicon (Si), germanium (Ge), lead (Pb), or phosphorus (P). Embodiment 11 is the supported platinum-tin (Pt—Sn) based catalyst of any of embodiments 1 to 10, wherein the catalyst is capable of converting $C_2$-$C_8$ alkanes to corresponding alkenes, preferably $C_3$ and $C_4$ alkanes to $C_3$ and $C_4$ alkenes. Embodiment 12 is the supported platinum-tin (Pt—Sn) based catalyst of any of embodiments 1 to 11, wherein the catalyst is suitable for use in a fixed bed and/or fluidized bed reactor.

Embodiment 13 is a process for preparing a supported platinum-tin (Pt—Sn) based catalyst, the process including the steps of (a) dry blending a zeolite, zinc aluminate, and calcium aluminate to form a support mixture; (b) adding an acid to the support mixture to form a support mixture paste; (c) calcining the support mixture paste to form a blended support material; (d) impregnating the blended support material with an aqueous promoter precursor solution containing an alkali metal or a compound thereof, an alkaline earth metal or a compound thereof; (e) calcining the impregnated blended support material to form a calcined promoter/support material; (f) impregnating the calcined promoter/support material with Pt and Sn to form a Pt/Sn/impregnated promoter/support material; (g) calcining the Pt/Sn/impregnated promoter/support material to form the Pt—Sn based catalyst. Embodiment 14 is the process of embodiment 13, containing from 5 to 75 wt. % of the zeolite, from 25 to 95 wt. % of the zinc aluminate, and 1 to 20 wt. % calcium aluminate based on the total weight of the support mixture. Embodiment 15 is the process of any of embodiments 13 to 14, wherein the zeolite contains one or more of SAPO-34, SAPO-11, SAPO-35, ZSM-5, MCM-41, SBA-15, preferably SAPO-34. Embodiment 16 is the process of any of embodiments 13 to 15, wherein the acid contains an organic acid, preferably acetic acid (AcOH) and/or an inorganic acid, preferably hydrochloric acid (HCl). Embodiment 17 is the process of any of embodiments 13 to 16, containing from 0.01 to 2 wt. % of the promoter based on the total weight of the catalyst. Embodiment 18 is the process of any of embodiments 13 to 17, wherein the aqueous promoter precursor solution contains one or more of lithium (Li), sodium (Na), potassium (K), rubidium (Rb), cesium (Cs), beryllium (Be), magnesium (Mg), calcium (Ca), strontium (Sr), or barium (Ba), preferably K. Embodiment 19 is the process of any of embodiments 13 to 18, containing from 0.01 to 10 wt. %, preferably 0.1 to 5 wt. % of platinum (Pt) and from 0.01 to 10 wt. %, preferably 0.1 to 5 wt. % of tin (Sn), based on the total weight of the catalyst. Embodiment 20 is the process of any of embodiments 13 to 19, wherein calcining in steps (c), (e), and (g) contains a temperature of 350 to 600° C.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which:

FIG. 1 depicts a system for producing olefins from alkanes via a direct dehydrogenation process.

DETAILED DESCRIPTION OF THE INVENTION

The catalysts of the present invention offer a solution to the problems associated with currently available supported dehydrogenation catalysts. The solution is premised on forming metal-based dehydrogenation catalysts supported by a blend of a zeolite and zinc aluminate and optionally calcium aluminate. The catalytically active metal can be platinum (Pt) or tin (Sn), both Pt and Sn. The resulting catalysts of the present invention can offer non-limiting advantages ranging from increased conversion of alkanes, increased selectivity towards olefins, lower catalyst deactivation rates, and/or robust hydrothermal stability.

These and other non-limiting aspects of the present invention are discussed in further detail in the following sections with reference to the Figures.

A. Supported Catalysts

1. Support Material

Embodiments herein describe the supported platinum and/or tin (Pt—Sn) based catalysts and methods of making and using the supported catalysts for the production of olefins. The support material of the catalysts of the present invention can include a zeolite, a zinc aluminate compound, and optionally a calcium aluminate compound. In preferred embodiments, the calcium aluminate is present in the support material.

Zeolites are microporous (i.e., <2 nm), aluminosilicate minerals commonly used as commercial adsorbents and catalysts (e.g., ion-exchange beds and gas separation technologies). Many unique zeolite frameworks have been identified and over 40 naturally occurring zeolite frameworks are known. In one aspect, the supported catalysts of the present invention can include from 5 to 75 wt. % of zeolite and all values and ranges there between (e.g., 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, or 74 wt.

%), based on the total weight of the support. The zeolite can include one or more of a SAPO zeolite, ZSM-5, MCM-41, SBA-15, etc.

SAPO (i.e., silico-alumino-phosphate) zeolites have an open microporous structure with regularly sized channels, pores or "cages." These materials are sometimes referred to as "molecular sieves" in that they have the ability to sort molecules or ions based primarily on the size of the molecules or ions. SAPO materials are both microporous and crystalline and have a three-dimensional crystal framework of $PO_4^+$, $AlO_4^-$, and $SiO_4$ tetrahedra. Non-limiting examples of SAPO materials that can be used to make the support material of the present invention include SAPO-11, SAPO-17, SAPO-18, SAPO-34, SAPO-35, SAPO-42, and SAPO-44. The relationship between the SAPO numbers and their structures is mentioned, for example, in Encyclopedia of Inorganic Chemistry, Vol. 8, 4369 (1994). For instance, the IUPAC codes corresponding to SAPO-17, 18, 34, 35, 42, and 44 are ERI, AEI, CHA, LEV, LTA, and CHA, respectively. A preferred SAPO zeolite is SAPO-34. SAPO-34 has the same framework structure of chabazite zeolite. SAPO-34 and processes of making SAPO-34 are disclosed in U.S. Pat. No. 4,440,871, which is incorporated by reference.

ZSM-5 (i.e., Zeolite Socony Mobil-5) is an aluminosilicate zeolite belonging to the pentasil family. The pentasil structures are linked together by oxygen bridges to form pentasil chains. A pentasil unit consists of eight five-membered rings where the vertices can include Al or Si and an O atom.

MCM-41 (i.e., Mobil Composition of Matter No. 41) and SBA-15 are mesoporous (i.e., 2 to 50 nm) materials with a hierarchical structure from a family of silicate and alumosilicate solids with ordered arrangement of cylindrical mesopores that form a one-dimensional pore system. Both materials are characterized by an independently adjustable pore diameter, a sharp pore distribution, a large surface, and a large pore volume. The pores are larger than with zeolites and the pore distribution can easily be adjusted between diameters of typically 2 nm to 6.5 nm for MCM-41 and greater than 5 nm for SBA-15.

Zinc aluminates including zinc dialuminum oxide composites [e.g., aluminum-doped zinc oxide (AZO), $ZnAl_2O_4$ spinel (gahnite), etc.] are a preferred material used in the catalyst support of the present invention due to their high chemical and thermal stability as well as high mechanical resistance and low surface acidity. The supported catalysts of the present invention can include from 25 to 95 wt. % of zinc aluminate compound and all values and ranges there between (e.g., 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, or 94 wt. %), based on the total weight of the support.

Calcium aluminates include a range of minerals typically obtained by heating calcium oxide and aluminum oxide together at high temperatures. The calcium aluminate compound that can be used in the present invention can be any of those that form stable phase aggregates including aluminous calcium cements. Exemplary compounds include tricalcium aluminate ($3CaO.Al_2O_3$, C3A), dodecacalcium hepta-aluminate ($12CaO.7Al_2O_3$, C12A7, mayenite), Monocalcium aluminate, $CaO.Al_2O_3$(CA), monocalcium dialuminate (CaO. $2Al_2O_3$, CA2), monocalcium hexa-aluminate ($CaO.6Al_2O_3$, CA6), dicalcium aluminate ($2CaO.Al_2O_3$, C2A), pentacalcium trialuminate ($5CaO.3Al_2O_3$, C5A3), tetracalcium trialuminate ($4CaO.3Al_2O_3$, $C_4A3$), dicalcium silicate ($Ca_2SiO_4$, belite), $Ca_2Al[AlSiO_7]$ (gehlenite), pleocrite, etc., or mixtures thereof. In particular aspect, the calcium aluminate compound is used as a binder in the blended support material. The supported catalyst can include from 0 to 20 wt. %, preferably 1 to 20 wt. %, of calcium aluminate compound and all values and ranges there between (e.g., 2, 3, 4, 5, 6, 7, 8, 9, 10, 11, 12, 13, 14, 15, 16, 17, 18, or 19 wt. %), based on the total weight of the support, with 12 wt. % being preferred.

2. Catalytic Material and Promoter Material

The catalytic material used to prepare the supported catalysts of the present invention include a Pt metal or a compound thereof and/or a Sn metal or a compound thereof. In certain instances, the catalysts of the present invention can be loaded with both Pt metal and with Sn metal (i.e., Pt—Sn supported catalyst). The active metal(s) included in the supported catalyst of the present invention can include from 0.01 to 10 wt. % and all values and ranges there between (e.g., 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9. 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, or 9.9 wt. %), preferably 0.1 to 3 wt. % of the Pt metal based on the total weight of the catalyst. Exemplary Pt metals or compounds thereof include Pt particles or Pt containing alloys, with Pt particles being preferred. Exemplary Pt metals thereof include Pt particles of nano-sized (0.1-2 nm) and well dispersed. In another aspect, the tin component includes tin, a tin oxide, other tin containing compounds, or a combination thereof. In yet another aspect, the tin component comprises a tin oxide. The catalyst composition can include from about 0.1 wt. % to about 5 wt. %, for example, about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2.0, 2.1, 2.2, 2.3, 2.4, 2.5, 2.6, 2.6, 2.7, 2.8. 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 wt. % tin; from about 0.5 wt. % to about 1.5 wt. %, for example, about 0.5, 0.6, 0.7, 0.8, 0.9, 1, 1.1, 1.2, 1.3, 1.4, or 1.5 wt. %; or from about 0.7 wt. % to about 1.2 wt. %, for example, 0.7, 0.8, 0.9, 1, 1.1 or 1.2 wt. % tin. In another aspect, the catalyst composition includes about 0.9-1.0 wt. % tin.

In other aspects of the invention, the supported catalysts can further include a metal compound as a promoter. Non-limiting examples of promoters include one or more of lithium (Li), sodium (Na), potassium (K), rubidium (Rb), cesium (Cs), beryllium (Be), magnesium (Mg), calcium (Ca), strontium (Sr), or barium (Ba), preferably K. In certain aspects, the promoter can further include scandium (Sc), yttrium (Y), lanthanum (La), titanium (Ti), zirconium (Zr), hafnium (Hf), vanadium (V), niobium (Nb), tantalum (Ta), chromium (Cr), molybdenum (Mo), tungsten (W), manganese (Mn), technetium (Tc), rhenium (Re), iron (Fe), ruthenium (Ru), osmium (Os), cobalt, (Co), rhodium (Rh), iridium (Ir), nickel (Ni), palladium (Pd), copper (Cu), silver (Ag), gold (Au), cadmium (Cd), mercury (Hg), gallium (Ga), indium (In), thallium (Tl), silicon (Si), germanium (Ge), lead (Pb), or phosphorus (P). Preferably, the promoter compound includes an alkali metal or compound thereof, an alkaline earth metal or compound thereof, or any combination thereof including at least potassium (K). Promoters can be added to the catalyst using known techniques, for example, impregnation, ion exchange, chemical deposition or the like. An amount of promoter can depend inter alia on the desired activity of the catalyst. In some embodiments, the amount of promoter can range from 0.001 to 5 wt. % or 0.01 to 2 wt. % and all ranges there between (e.g., 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, or 1.9 wt. %), based on the total weight of the catalyst. Exemplary promoter metals include lithium (Li), sodium (Na), potassium (K), rubidium (Rb), cesium (Cs), magnesium (Mg), and calcium (Ca). The promoters or corresponding stable derivatives thereof (e.g., halides, oxides, etc.) can be purchased from commercial manufactures such as Sigma-Aldrich®, USA.

B. Methods of Making the Catalysts

The catalysts of the present invention can be prepared by using the following non-limiting steps.

Step 1 of the method can include dry blending a zeolite, zinc aluminate and optionally calcium aluminate to form a support mixture. The dry blending step can be performed by using suitable mixing equipment such as grinders, tumblers, stationary shells or troughs, Muller mixers (for example, batch type or continuous type), impact mixers, and any other generally known mixers. Once blended, the blend can be contacted with an acidic aqueous solution to form a support mixture paste. Non-limiting examples of acids can include an organic acid or an inorganic acid. Organic acids can include formic acid ($HCO_2H$), acetic acid (AcOH), trifluoroacetic acid (TFAA), propionic acid, butyric acid, valeric acid, carproic acid, oxalic acid, lactic acid, malic acid, citric acid, benzoic acid, carbonic acid, uric acid, p-toluenesulfonic acid (PTSA), trifluoromethanesulfonic acid (TfOH) or combinations thereof, preferably acetic acid (AcOH). Inorganic acids can include hydrochloric acid (HCl), nitric acid ($HNO_3$), phosphoric acid ($H_3PO_4$), sulfuric acid ($H_2SO_4$) or combinations thereof, preferably hydrochloric acid (HCl). The resulting acidified paste can then be dried at a temperature of 60° C. to 120° C. and calcined at a temperature of 350° C. to 600° C. and all values and ranges there between, to form a blended and calcined support material.

Step 2 of the method can include impregnating the blended and calcined support material from step 1 with an aqueous promoter precursor solution comprising an alkali metal salt and/or an alkaline earth metal salt solubilized therein. The catalyst composition of the present invention can also include a base promoter and one or more additional promoters. In a non-limiting example, the alkali metal promoter can be potassium metal, a potassium oxide, other potassium containing compounds, or a combination thereof. In yet another aspect, the potassium component can include a potassium oxide. The catalyst composition can include from about 0.2 wt. % to about 1.0 wt. %, about 0.2 wt. % to about 0.8 wt. %, or from about 0.4 wt. % to about 0.8 wt. %, or about 0.2, 0.3, 0.4, 0.5, 0.6, 0.7, 0.8, 0.9 or 1.0 wt. % potassium based on the total catalyst compositions. In another aspect, the catalyst composition include about 0.5-0.6 wt. % potassium. In one aspect, a support material can be contacted with a potassium containing compound. In another aspect, a support material can be contacted with a water soluble potassium containing compound. In other aspects, the potassium containing compound can include a salt, such as, for example, a potassium chloride. The concentration of any solution and/or suspension of a potassium compound can vary depending upon the specific target composition. In one aspect, a 0.03 M aqueous solution of KCl can be contacted with a support material. In another aspect, other potassium containing compounds can be used and one of skill in the art could readily select an appropriate potassium containing compound. Potassium containing compounds, such as, for example, potassium chloride, are commercially available. The impregnated material can then be dried at a temperature to remove water, and then calcined in a flow of air at a temperature of 400° C. to 600° C., preferably 500° C. and all values and ranges there between to form a calcined support containing the promoter material.

In one aspect, a tin component is added to the potassium promoted support. In one aspect, a support material can be contacted with a tin containing compound. In another aspect, a support material can be contacted with a water soluble tin containing compound. In other aspects, the tin containing compound can include a salt, such as, for example, a stannic chloride. In some embodiments, the tin compound and the promoter are impregnated into the support as one solution. The concentration of any solution and/or suspension of a tin compound can vary depending upon the specific target composition. In one aspect, a 0.15 M aqueous solution of $SnCl_4$ can be contacted with a support material. In another aspect, other tin containing compounds can be used and one of skill in the art could readily select an appropriate tin containing compound. Tin containing compounds, such as, for example, stannic chloride, are commercially available. The impregnated material can then be dried at a temperature to remove water, and then calcined in a flow of air at a temperature of 400° C. to 600° C., preferably 500° C. and all values and ranges there between to form a support material containing the promoter material and Sn. In some embodiments, the tin component is not added in Step 2.

Step 3 of the method can include further include impregnating the calcined promoter/support material with Pt and/or Sn to form a Pt/Sn/impregnated promoter/support material. This impregnation step can be performed by obtaining a platinum and/or tin precursor material (e.g., platinum salts and/or tin salts) that are solubilized in an aqueous solution. The calcined promoter/support material can then be contacted with the aqueous solution to impregnate Pt and/or Sn into the material. The impregnated material can then be dried at a temperature to remove water, and then calcined in a flow of air at a temperature of 400° C. to 600° C., preferably 500° C. and all values and ranges there between, to form a supported platinum (Pt), tin (Sn), or platinum-tin (Pt—Sn) based catalysts of the present invention.

The morphology, structure, and quality of the supported catalysts of the present invention can be evaluated using techniques, such as, but not limited to, X-ray fluorescence ()XRF), X-ray diffraction (XRD), scanning electron microscopy (SEM), high-resolution transmission electron microscopy (HRTEM), transmission electron microscopy (TEM), X-ray photoelectron spectroscopy (XPS).

C. Olefin Production

1. Methods and Systems

The supported catalysts of the present invention can be used to catalyze the conversion of alkanes to olefins. Conditions sufficient for olefin production (e.g., ethylene, propylene, and butylenes) include temperature, time, alkane concentration, space velocity, and pressure. The temperature range for olefin production may range from about 520° C. to 620° C., preferably ranging 580° C. to 600° C. A gas hourly space velocity (GHSV) of alkane higher than 0.1 $h^{-1}$ can be used, preferably between 2 and 10 $h^{-1}$, more preferably between 3 and 8 $h^{-1}$. The conversion of alkane can carried out at a pressure from about −0.1 MPa to 0.3 MPa, preferably ranging from 0.05 MPa to 0.15 MPa, or at atmospheric pressure. The conditions for olefin production may be varied based on the type of the reactor.

The reaction of the methods and system disclosed herein can occur in any type of reactor. Non-limiting examples of reactors include a fixed bed dehydrogenation reactor or a fluidized-bed dehydrogenation reactor. It is also envision the method and systems may also include the ability to regenerate used/deactivated catalyst in a continuous process such as in a fluidized bed reactor. The method and system can further include collecting or storing the produced olefin hydrocarbon product along with using the produced olefin hydrocarbon product to produce downstream petrochemical and/or polymer products.

Referring to FIG. 1, a system 10 is illustrated, which can be used to convert alkanes to olefin hydrocarbon products with the supported catalysts of the present invention. The system 10 can include an alkane source 11, a reactor 12, and a collection device 13. The alkane source 11 can be configured to be in fluid communication with the reactor 12 via an inlet 17 on the reactor. As explained above, the alkane source can be configured such that it regulates the amount of alkane feed entering the reactor 12. The reactor 12 can include a reaction zone 18 having the supported catalysts 14 of the present invention. The amounts of the alkane feed 11 and the catalyst 14 used can be modified as desired to achieve a given amount of product produced by the system 10. The reactor 12 can include an outlet 15 for products produced in the reaction zone 18. The products produced can include olefins such as $C_2$ to $C_8$ olefins. In preferred instances, the products are $C_2$ to $C_4$ olefins (e.g., ethylene, propylene, and butylene). The collection device 13 can be in fluid communication with the reactor 12 via the outlet 15. Both the inlet 17 and the outlet 15 can be open and closed as desired. The collection device 13 can be configured to store, further process, or transfer desired reaction products (e.g., $C_2$-$C_8$ olefins) for other uses. By way of example only, FIG. 1 provides non-limiting uses of ethylene and propylene produced from the catalysts and processes of the present invention. Still further, the system 10 can also include a heating source 16. The heating source 16 can be configured to heat the reaction zone 18 to a temperature sufficient (e.g., 500 to 620° C.) to convert the alkanes in the alkane feed to olefin hydrocarbon products. A non-limiting example of a heating source 16 can be a temperature controlled furnace. Additionally, any unreacted alkane can be recycled and included in the alkane feed to further maximize the overall conversion of alkane to olefin products. Further, certain products or byproducts such as alkynes can be separated and used in other processes to produce commercially valuable chemicals (e.g., propylene). This increases the efficiency and commercial value of the alkane conversion process of the present invention.

2. Alkane Feed

The alkane feed may include one or more alkanes. An alkane or parafin is an acyclic saturated hydrocarbon having the following structure: $C_nH_{(2n+2)}$, where n is an integer, n ranges from 2 to 8, preferably 2 to 4. Mixtures of alkanes can include linear straight chain and/or branched chain saturated hydrocarbons. Linear alkanes can include ethane, propane, n-butane, n-pentane, n-hexane, n-heptane, and n-octane. Branched alkanes can include isobutane, isopentane, neopentane, 2-methylpentane, 3-methylpentane, 2,3-dimethylbutane, 2,2-dimethylbutane, 2-methylhexane (isoheptane), 3-methylhexane, 2,2-dimethylpentane, 2,3-dimethylpentane, 2,4-dimethylpentane, 3,3-dimethylpentane, 3-ethylpentane, 2,2,3-trimethylbutane, 2-methylheptane, 3-methylheptane, 4-methylheptane, 3-ethylhexane, 2,2-dimethylhexane, 2,3-dimethylhexane, 2,4-dimethylhexane, 2,5-dimethylhexane, 3,3-dimethylhexane, 3,4-dimethylhexane, 3-ethyl-2-methylpentane, 3-ethyl-3-methylpentane, 2,2,3-trimethylpentane, 2,2,4-trimethylpentane, 2,3,3-trimethylpentane, 2,3,4-trimethylpentane, 2,2,3,3-tetramethylbutane, and stereoisomers thereof, or mixtures thereof. The feed may include about 10, 15, 20, 40, 50 mole % or more of an alkane. The alkane feed may also contain nitrogen, helium, aromatic hydrocarbons, and so on as inert compounds. Preferably the alkane feed is relatively pure, containing less than 20, 19, 18, 17, 16, 15, 14, 13, 12, 11, 10, 9, 8, 7, 6, 5, 4, 3, 2, 1 wt. % of impurities and/or inert compounds.

Alkanes for use in the present invention can be isolated from natural gas and crude oil by fractional distillation, such as a petroleum refining process or prepared by a Fischer-Tropsch process. Alternatively, alkanes are commercially available from a wide range of sources (e.g., Praxair, Danbury, Conn.; Sigma-Aldrich Co. LLC, St. Louis, Mo.; BOC Sciences USA, Shirley, N.Y.).

3. Catalyst Activity/Selectivity

Catalytic activity as measured by alkane conversion can be expressed as the % moles of the alkane converted with respect to the moles of alkane fed. In particular aspects, the selectivity to the corresponding olefin is at least 88 to 98%, preferably at least 91 to 94%, and/or wherein the conversion of alkane is at least 32 to 42%.

As an example, propane ($C_3H_8$) is used here to define conversion and maximum selectivity of products by the following equations (I) and (II):

$$\% \ C_3H_8 \ \text{Conversion} = \frac{(C_3H_8)° - (C_3H_8)}{(C_3H_8)°} \times 100, \quad (I)$$

where, $(C_3H_8)°$ and $(C_3H_8)$ are moles of propane in the feed and reaction product, respectively.

Maximum selectivity is defined as mole % and are defined for propene, 1-butene, 2-butene and so on as follows:

$$\% \ \text{Propene Selectivity} = \frac{2(C_3H_6)}{(C_3H_8)° - (C_3H_8)} \times 100, \quad (II)$$

where the numerator is the carbon adjusted mole of propene and the denominator is the moles of carbon converted.

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results. The materials used in the following examples are described in Table 1, and were used as-described unless specifically stated otherwise.

TABLE 1

| Material | % Content |
| --- | --- |
| SAPO-34 | 60 |
| zinc aluminate | 28 |
| calcium aluminate | 12 |
| K | 0.5 |
| Pt | 0.5 |
| Sn | 1 |

Example 1

Preparation of a Supported Pt—Sn Catalyst

SAPO-34 (60 wt. %), zinc aluminate (28 wt. %), and calcium aluminate (12 wt. %) were mixed and dry blended to a well grinded form and then converted into a paste by diluted organic (e.g., acetic acid) and/or inorganic acid (e.g., HCl) and then calcined. The calcined support material was then impregnated with potassium (0.5 wt. %) dissolved in aqueous solution and then calcined. The calcined promoter/support material was then further impregnated with Pt (0.5 wt. %) and Sn (1 wt. %), dried, and then calcined to afford the final supported Pt—Sn catalyst.

Example 2

Dehydrogenation of Propane to Propylene Process

The catalyst was tested in the dehydrogenation of propane to propylene reaction in an iso-thermal fixed bed reactor at a WHSV of 5.5 h$^{-1}$ and 590° C. Table 1 lists the conversion and selectivity at 1 and 5 hours time on stream.

TABLE 1

| TOS = 1 hr | | TOS = 5 hr | |
| --- | --- | --- | --- |
| Conversion | Selectivity | Conversion | Selectivity |
| 36 | 94.5 | 32 | 96 |

The invention claimed is:

1. A supported platinum-tin (Pt—Sn) based catalyst comprising:
   a support comprising:
      a zeolite;
      a zinc aluminate compound; and
      a calcium aluminate compound;
   catalytically active metals comprising:
      Pt metal or a compound thereof; and
      Sn metal or a compound thereof; and
   a promoter comprising an alkali metal selected from the group consisting of sodium and lithium or compound thereof, an alkaline earth metal or compound thereof, or any combination thereof; wherein the alkaline earth metal is not calcium;
   wherein the promoter further comprises a member selected from the group consisting of scandium, hafnium, mercury and lead;
   wherein if the promoter comprises hafnium, the promoter also comprises from 0.01 to 10 wt. % of the Pt metal or a compound thereof, based on the total weight of the catalyst.

2. The supported platinum-tin (Pt—Sn) based catalyst of claim 1, comprising from 25 to 95 wt. % of the zinc aluminate, based on the total weight of the support.

3. The supported platinum-tin (Pt—Sn) based catalyst of claim 1, wherein the promoter comprises lithium (Li).

4. The supported platinum-tin (Pt—Sn) based catalyst of claim 3, wherein the promoter comprises sodium (Na).

5. The supported platinum-tin (Pt—Sn) based catalyst of claim 1, wherein the promoter comprises mercury.

6. A process for preparing the supported platinum-tin (Pt—Sn) based catalyst of claim 1, the process comprising the steps of:
   (a) dry blending a zeolite, zinc aluminate, and calcium aluminate to form a support mixture;
   (b) adding an acid to the support mixture to form a support mixture paste;
   (c) calcining the support mixture paste to form a blended support material;
   (d) impregnating the blended support material with an aqueous promoter precursor solution comprising an alkali metal selected from the group consisting of sodium and lithium or a compound thereof, an alkaline earth metal, scandium, hafnium, mercury, lead or a compound thereof;
   (e) calcining the impregnated blended support material to form a calcined promoter/support material;
   (f) impregnating the calcined promoter/support material with Pt and Sn to form a Pt/Sn/impregnated promoter/support material;
   (g) calcining the Pt/Sn/impregnated promoter/support material to form the Pt—Sn based catalyst.

7. A supported platinum-tin (Pt—Sn) based catalyst comprising:
   a support comprising:
      a zeolite;
      a zinc aluminate compound; and
      a calcium aluminate compound;
   catalytically active metals comprising:
      Pt metal or a compound thereof; and
      Sn metal or a compound thereof; and
   a promoter consisting of lithium (Li), rubidium (Rb), cesium (Cs) and beryllium (Be).

8. A supported platinum-tin (Pt—Sn) based catalyst comprising:
   a support comprising a blend of:
      a zeolite;
      a zinc aluminate compound; and
      a calcium aluminate compound;
   catalytically active metals comprising:
      Pt metal or a compound thereof; and
      Sn metal or a compound thereof; and
   a promoter comprising an alkali metal or compound thereof, an alkaline earth metal or compound thereof, or any combination thereof; wherein the alkaline earth metal is not calcium;
   wherein the support comprises from 5 to 75 wt. % of the zeolite, based on the total weight of the support; and
   wherein the zeolite comprises a member selected from the group consisting of one or more of SAPO-34, SAPO-11, SAPO-35, ZSM-5, MCM-41 and SBA-15; and
   wherein the promoter further comprises at least one member selected from the group consisting of vanadium, rhenium, silver and gold.

9. The supported platinum-tin (Pt—Sn) based catalyst of claim 8, wherein the promoter comprises sodium and rhenium.

10. The supported platinum-tin (Pt—Sn) based catalyst of claim 8, wherein the promoter comprises barium and rhenium.

11. The supported platinum-tin (Pt—Sn) based catalyst of claim 1, wherein the zeolite comprises ZSM-5 and MCM-41.

* * * * *